July 8, 1958 W. TRUCHAN 2,842,168
SWINGABLE POWER SAW SUPPORT AND GUIDE
Filed Aug. 26, 1957 2 Sheets-Sheet 1

INVENTOR.
William Truchan
ECKHOFF & SLICK
ATTORNEYS
BY
A MEMBER OF THE FIRM

July 8, 1958 W. TRUCHAN 2,842,168
SWINGABLE POWER SAW SUPPORT AND GUIDE
Filed Aug. 26, 1957 2 Sheets-Sheet 2

INVENTOR.
William Truchan

ECKHOFF & SLICK
ATTORNEYS

BY
A MEMBER OF THE FIRM

United States Patent Office 2,842,168
Patented July 8, 1958

2,842,168

SWINGABLE POWER SAW SUPPORT AND GUIDE

William Truchan, Berkeley, Calif.

Application August 26, 1957, Serial No. 680,073

3 Claims. (Cl. 143—46)

This invention relates in general to a hand operated electric saw and, more particularly, to means for supporting and guiding an electric saw.

It is an object of this invention to provide a support and guide means for a portable hand wood-cutting saw.

It is another object of this invention to provide a structure which is suitable for mounting thereon a portable hand electric saw—such structure both supporting the saw and thereby lessening the work of the operator and further serving as a cutting guide or control.

Other objects and advantages of this invention, if not specifically set forth, will become apparent during the course of the description which follows.

Figure 1:
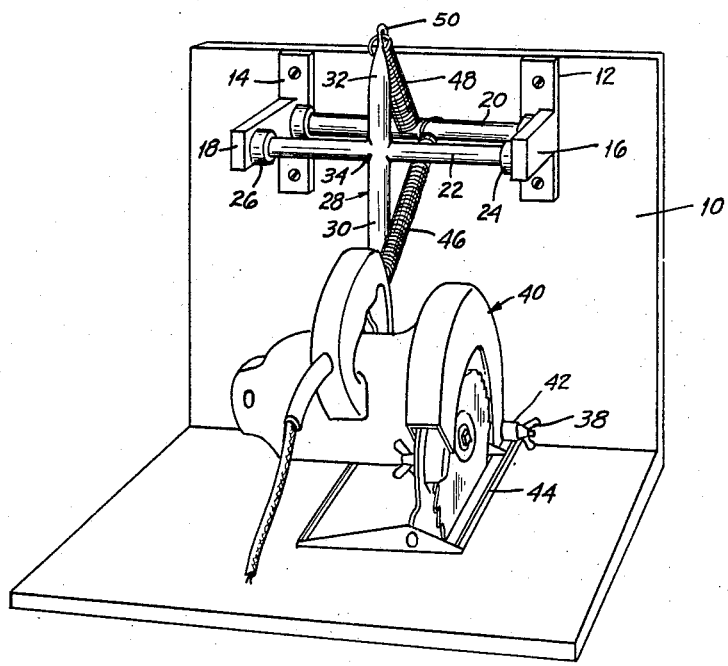
Figure 1 is an isometric view showing an electric hand saw mounted in place on the support and guide of this invention.

Generally, the structure of the present invention encompasses a combination of a support and guide for an electric hand saw and the accompanying saw, the supporting structure constituting a pair of opposed brackets suitable for attachment to a vertical planar surface such as a wall, each of the brackets having outwardly extending horizontal load bearing arms, the horizontal arms being joined at either end thereof by means of a pair of rods, the rods being positioned substantially at opposite ends of the arms.

The outermost of the rods is journalled in the arms and has perpendicularly and fixedly mounted thereon a lever of the first class. As an alternative, it is also possible to break the lever arm up into two portions, each fixedly secured in a spaced manner relative to one another along the length of the journalled rod. However, as shown in the drawings, most conveniently and preferably, a simple first-class lever is employed.

The journalled rod acts as the axis for pivotal movement of the lever which has a normally downwardly extending elongated (power) component which is provided with means for pivotal attachment to the forward end of the hand saw, thus providing this end of the saw with support. The second and normally upwardly extending portion of the lever, the weight or resistance portion thereof, is provided with means for attaching a spring thereto.

Figure 3:
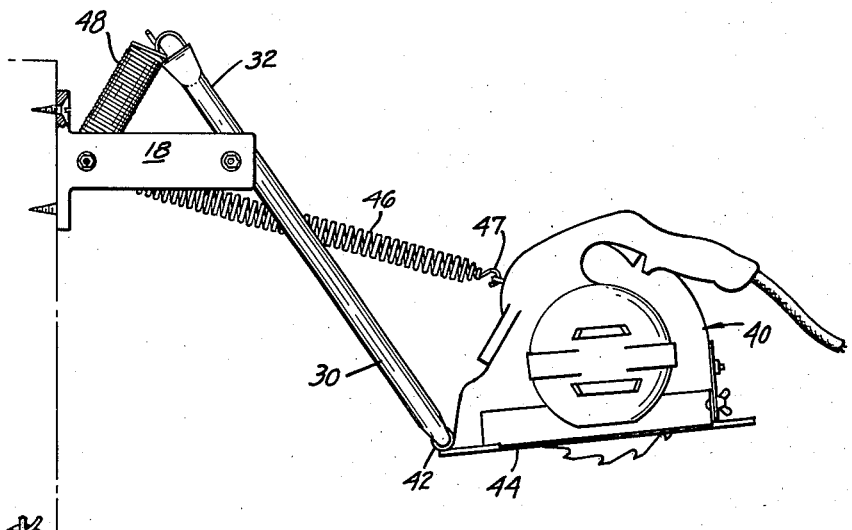
Figure 3 is a side elevation of the combination of Figure 2 showing the saw and bracket, the lever also being in equilibrium.

The spring is secured in its opposite end to the innermost of the parallel rods, thereby limiting the amount of pivotal movement possible about the journalled rod. Preferably, at substantially the same point a second spring is attached to the innermost of the parallel rods, this spring being attached at its opposite end to some point on the saw fairly well removed from the point of pivotal attachment to the lever. This spring is of such elasticity that the hand saw is supported in a normally horizontal position as shown in Figure 3 when not in use—both springs being in equilibrium at this point. Throughout the arc described as the lever is pivoted, the spring second mentioned aids in maintaining the saw in a substantially horizontal position, any necessary modification in the orientation of the saw being readily effected by the operator with a minimum of effort.

When the saw is released, the action of the springs is such as to return the saw to a horizontal position slightly above the work surface. The springs reach equilibrium when the saw is again so poised.

Referring now to the drawings wherein like characters refer to like parts throughout, Figure 1 shows the overall structure including a suitable vertical planar surface 10 upon which is mounted the supporting mechanism. The guide and support structure comprises a pair of brackets 12 and 14 having means for fixedly securing them to the wall—heavy screws being suitable. Each of the brackets has, as a part thereof, an outwardly extending horizontal arm, these being designated 16 and 18, respectively. Thus, the brackets consist of T-shaped members which may be affixed to a supporting wall.

A pair of parallel rods is supplied for purposes of joining the two horizontally extending arms, these rods being designated 20 and 22. The forward-most of these rods, 22, is journalled in bearings 24 and 26.

A lever, generally 28, consists of a power end 30 and a weight or resistance end 32, and is fixedly secured to the journalled rod at point 34. Thus, a first-class lever is formed having its fulcrum at point 34. The lever pivots about the axis of rod 22.

Figure 2:
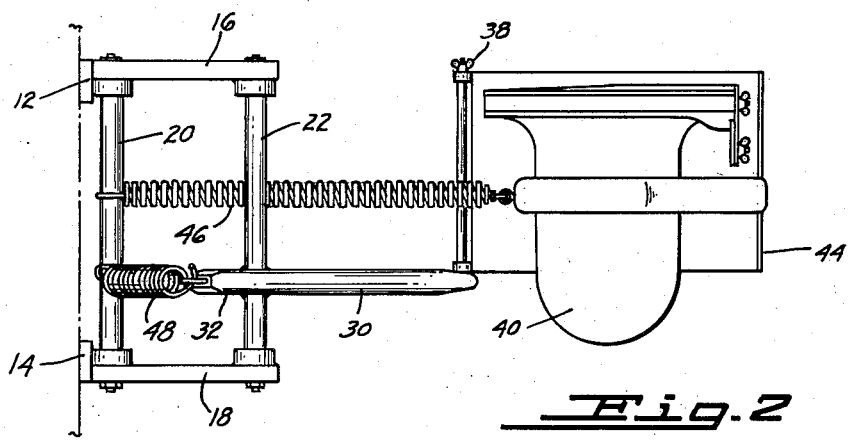
Figure 2 is a top plan view of the support having a hand saw mounted thereon, the lever arrangement being shown in equilibrium.
Figure 4:
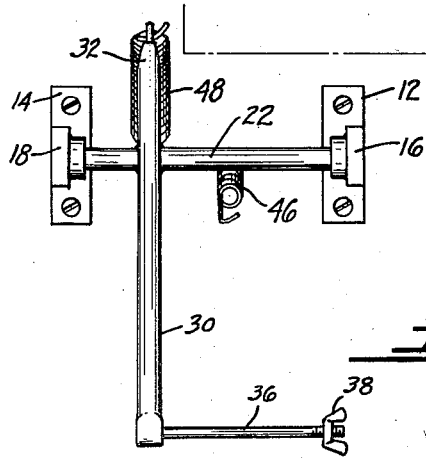
Figure 4 is a top plan view of the support—but without the saw mounted thereon.

As shown in Figures 2 and 4, a bolt 36 is mounted at the power end of the lever 30, this bolt being provided with a wing nut 38 so that various saws may be interchanged. For pivotally attaching the lever arm 28 to the saw 40, the bolt 36 is journalled in bearings 42 mounted at either end of the shoe 44 carried by saw 40.

In the absence of additional supporting means for the saw, it would tend to pivot in a clockwise direction (as viewed in Figure 3) and, to correct this situation, additional support means are provided for maintaining the saw in a normally horizontal position. The additional support means comprises spring 46 fixedly secured at one end thereof to the innermost of the horizontal rods 20, and at the other end thereof to any suitable spot on the hand saw. Of course, the farther removed the point of attachment of spring 46 is from bearings 42, the more readily will the saw be supported—and a lighter spring thereby will be needed.

The opposite end of the lever is prevented from describing too large an arc by means of another spring 48, secured at point 50 to the weight end of the first-class lever and at its (the spring's) opposite end to the innermost of the parallel rods 20.

The springs used and the lengths of the lever arms selected are so balanced that the hand saw, when not in use, is suspended several inches above the work surface in a substantially horizontal position. This state is shown in Figures 1 and 3.

In operation, the bracket is mounted on the wall and a hand saw is positioned such that it may be attached pivotally through bearings 42 upon bolt 36 and the opposite end of such power saw supported by means of spring 46. When not in use, the hand saw should remain poised slightly above the work surface. When the saw is to be used, the operator exerts pressure on the handle, thereby forcing the power end of the lever in a downwardly direction, resistance being offered by spring 48 attached to the weight end 32 of the first-class lever at point 50. When cutting has been completed, the springs will serve to return the saw to the normal position, i. e., with the saw poised slightly above the work surface.

Obviously many modifications and variations of the invention as hereinbefore set forth may be made without departing from the spirit and scope thereof, and therefore only such limitations should be imposed as are indicated in the appended claims.

I claim:

1. Supporting and guiding means for an electric hand saw comprising: a pair of opposed brackets suitable for attachment to a vertical planar surface, said brackets each including an outwardly extending horizontal supporting arm, said horizontal arms being joined by a pair of parallel rods, said rods being positioned substantially at opposite ends of said arms, the outermost of said rods being journalled in said arms; a lever fixedly secured to said journalled rod substantially perpendicular thereto for pivotal movement about the axis of said journalled rod, said lever including a normally downwardly extending portion terminating in means for pivotal attachment to the forward end of a hand saw; said lever including a second portion fixedly secured to said journalled rod substantially perpendicular thereto, said second lever portion extending substantially opposite in direction to said first mentioned lever portion; a spring secured to the free end of said second lever portion, said spring being secured at its opposite end to the innermost of the said rods whereby to normally urge said second lever portion toward said innermost rod; and a second spring secured to said innermost rod at one end thereof and suitable for attachment to an electric hand saw at the opposite end of the spring and a point on the hand saw spaced from the lever attachment, said second spring being of sufficient elasticity to normally maintain an electric hand saw in a substantially horizontal position when employed in co-operation with said lever.

2. Supporting and guiding means for an electric hand saw comprising: a pair of opposed brackets suitable for attachment to a vertical planar surface, said brackets each including an outwardly extending horizontal supporting arm, said horizontal arms being joined by a pair of parallel spaced rods, said rods being positioned substantially at opposite ends of said arms, the outermost of said rods being journalled in said arms; a lever fixedly secured to said journalled rod substantially perpendicular thereto for pivotal movement about the axis of said journalled rod, said lever including a normally downwardly extending portion terminating in means for pivotal attachment to the forward end of a hand saw, and a second upwardly extending portion being a continuation of said downwardly extending portion and terminating in means for attachment to a spring; a spring being secured to the upwardly extending end of said lever, said spring being secured at the opposite end thereof to the innermost of said rods whereby to form a first-class lever normally urging said downwardly extending portion in an upward direction and said upwardly extending portion toward the horizontal; and a second spring secured to said innermost rod at one end thereof and suitable for attachment to an electric hand saw at a point removed from the point of attachment of said lever, said second spring being of sufficient elasticity to normally maintain an electric hand saw in a substantially horizontal position raised from a work surface.

3. The combination of an electric hand saw and means for supporting and guiding said electric hand saw, said supporting means including a pair of opposed brackets suitable for attachment to a vertical planar surface, said brackets each including an outwardly extending horizontal supporting arm, said horizontal arms being joined by a pair of parallel rods, said rods being positioned substantially at opposite ends of said arms, the outermost of said rods being journalled in said arms; a lever fixedly secured at the fulcrum to said journalled rod in substantially perpendicular relationship relative thereto for pivotal movement about the axis of said journalled rod; the power end of said lever including means for pivotal attachment to the forward end of a hand saw, the weight end of said lever arm having secured thereto a spring, said spring being secured at the opposite end thereof to the innermost of said parallel rods joining said outwardly extending arms; a second spring fixed at one end thereof to said innermost parallel rod; an electric hand saw pivotally supported at one point by the power end of said lever and supported at another point by said second mentioned spring, said spring and lever co-operating to normally maintain said hand electric saw in a substantially horizontal position above a work area, the length of each lever portion and the elasticity of each spring being so proportioned that said springs are in equilibrium when said saw is raised above said work area.

References Cited in the file of this patent

UNITED STATES PATENTS

| | | |
|---|---|---|
| 411,839 | Taft | Oct. 1, 1889 |
| 1,168,355 | Wear | Jan. 18, 1916 |
| 2,602,474 | Truchan | July 8, 1952 |
| 2,708,952 | Blackwell | May 24, 1955 |
| 2,718,907 | Fjalstad | Sept. 27, 1955 |